United States Patent
Su et al.

(10) Patent No.: US 8,780,042 B2
(45) Date of Patent: Jul. 15, 2014

(54) CURSOR CONTROL METHOD

(75) Inventors: Tzung Min Su, Hsin-Chu (TW); Chih Hsin Lin, Hsin-Chu (TW); Hsin Chia Chen, Hsin-Chu (TW); Yu Chia Lin, Hsin-Chu (TW)

(73) Assignee: Pixart Imaging Inc., Hsin-Chu (TW)

( * ) Notice: Subject to any disclaimer, the term of this patent is extended or adjusted under 35 U.S.C. 154(b) by 302 days.

(21) Appl. No.: 13/272,410

(22) Filed: Oct. 13, 2011

(65) Prior Publication Data
US 2012/0092252 A1 Apr. 19, 2012

(30) Foreign Application Priority Data
Oct. 13, 2010 (TW) ................................ 99134838 A

(51) Int. Cl.
*G09G 5/08* (2006.01)

(52) U.S. Cl.
USPC .......................................... 345/157; 345/156

(58) Field of Classification Search
USPC .................................................. 345/156–179
See application file for complete search history.

(56) References Cited

U.S. PATENT DOCUMENTS

| | | | |
|---|---|---|---|
| 6,362,842 B1 * | 3/2002 | Tahara et al. ................. | 715/856 |
| 2002/0039092 A1 * | 4/2002 | Shigetaka ..................... | 345/156 |
| 2005/0231472 A1 * | 10/2005 | Gordon et al. ................ | 345/157 |
| 2006/0267934 A1 * | 11/2006 | Harley et al. ................. | 345/157 |
| 2008/0211773 A1 | 9/2008 | Lin et al. | |
| 2010/0103191 A1 | 4/2010 | Chen et al. | |

* cited by examiner

*Primary Examiner* — Premal Patel
(74) *Attorney, Agent, or Firm* — Lowe Hauptman & Ham, LLP

(57) ABSTRACT

The present invention provides a cursor control method for adjusting a smoothness of a cursor motion shown on an image display according to a trace variation detected by a detection device.

16 Claims, 6 Drawing Sheets

CURSOR CONTROL METHOD

CROSS REFERENCE TO RELATED APPLICATION

This application claims the priority benefit of Taiwan Patent Application Serial Number 099134838, filed on Oct. 13, 2010, the full disclosure of which is incorporated herein by reference.

BACKGROUND

1. Field of the Invention

This invention generally relates to an interactive image system and, more particularly, to a cursor control method capable of dynamically adjusting a smoothing parameter of the cursor motion.

2. Description of the Related Art

An interactive image system generally includes a navigation device and an image display device. The navigation device may be a mouse or a pointing device configured to estimate a displacement and to transmit the displacement to the image display device. Accordingly, a user can relatively control the motion of a cursor shown on the image display device by using the navigation device.

However, the displacement sent to the image display device from the navigation device is a quantized value, and if this quantized displacement is not smoothed, the cursor shown on the image display device will move in zigzag motion corresponding to the quantized displacement. In this manner, when a user wants to perform a drawing operation on the image display device by using the navigation device, it is difficult to draw a graph desired by the user. Therefore, a smoothing parameter will generally be used in the navigation device to adjust the smoothness of the cursor motion.

However, improper selection of the smoothing parameter can influence the cursor motion outputted by the navigation device. If the smoothness is set too high, it is difficult to real-timely reflect a trace variation detected by the navigation device so that a sharp motion or a small range motion will have a poor performance; on the contrary, if the smoothness is set too low, a smooth motion is not easy to be obtained. Therefore, how to select a proper smoothing parameter real-timely during operation is a crucial issue in the navigation field.

Accordingly, the present invention provides a cursor control method capable of dynamically adjusting a smoothing parameter of a cursor motion that can be used to adjust a smoothness of the cursor motion shown on an image display according to the trace variation detected by a detection device.

SUMMARY

The present invention provides a cursor control method that can real-timely adjust a smoothing parameter according a current variation of the cursor motion so as to output the operation motion desired by a user.

The present invention provides a cursor control method for adjusting a smoothness of a cursor motion shown on an image display according to the trace variation detected by a detection device.

In one embodiment, the cursor control method includes the steps of: calculating a plurality of trace lengths with the detection device; obtaining a maximum length of the plurality of trace lengths; and adjusting the smoothness according to a comparison result of the maximum length and a length threshold.

In another embodiment, the cursor control method includes the steps of: calculating a plurality of motion vectors with the detection device; calculating included angles between every two successive motion vectors; comparing the included angles with an angle threshold to obtain a count value; and adjusting the smoothness according to the count value.

In an alternative embodiment, the cursor control method includes the steps of: calculating a plurality of trace lengths and motion vectors with the detection device; calculating included angles between every two successive motion vectors; obtaining a maximum length of the plurality of trace lengths and obtaining a count value according to the included angles; comparing the maximum length with a length threshold; decreasing the smoothness when the maximum length is smaller than the length threshold; and adjusting the smoothness according to the count value when the maximum length is larger than the length threshold.

In the cursor control method of the present invention, the detection device may be a mouse, a pointing device or a touch control device.

In the cursor control method of the present invention, the detection device may further detect a predetermined number of coordinates and calculate the plurality of trace lengths and the plurality of motion vectors according to the predetermined number of coordinates.

BRIEF DESCRIPTION OF THE DRAWINGS

Other objects, advantages, and novel features of the present invention will become more apparent from the following detailed description when taken in conjunction with the accompanying drawings.

DETAILED DESCRIPTION OF THE EMBODIMENT

Figure 1:
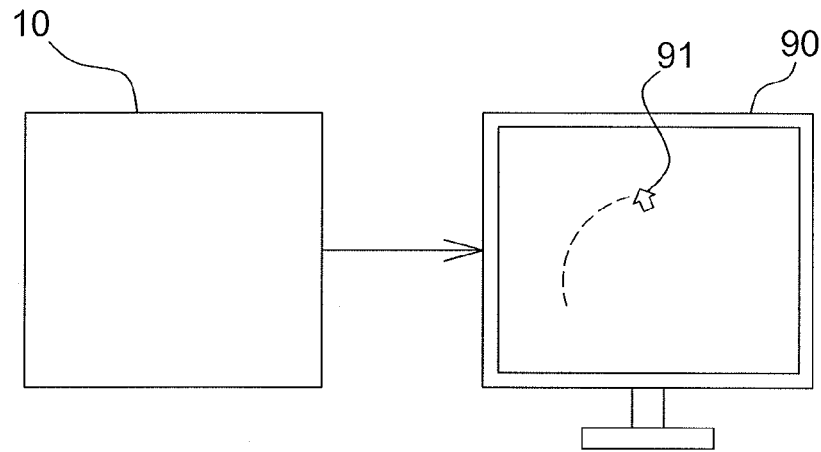
FIG. 1 shows a block diagram of the interactive image system according to an embodiment of the present invention.

In the drawings of the present invention, only a part of the components are shown and other components that are not directly related to the present invention are omitted.

It should be noted that, wherever possible, the same reference numbers will be used throughout the drawings to refer to the same or like parts.

Please refer to FIG. 1, it shows a block diagram of the interactive image system according to an embodiment of the present invention. The interactive image system includes a detection device 10 and an image display 90. The detection device 10 may be a mouse, a pointing device, a touch control device or other conventional devices for detecting coordinates and/or moving traces. The detection device 10 preferably includes a processing unit for calculating coordinates, distances between detection points and/or motion vectors of the cursor to be controlled so as to accordingly control the motion of a cursor 91 shown on the image display 90, and for calculating a smoothing parameter according to a motion variation (e.g. the sharpness of motion or the range of motion) of the cursor 91 so as to accordingly control a smoothness of the motion of the cursor 91 shown on the image display 90.

It is appreciated that the detection device 10 may be separated from or integrated in the image display 90 according to different applications. For example, when the detection device 10 is a mouse or a pointing device, the detection device 10 may be physically separated from the display device 90 but electrically or wirelessly coupled to the image display 90. When the detection device 10 is a touch control device, it may be combined with the image display 90 to form an interactive image system. It should be mentioned that, a method that a detection device detects the moving trace thereof is well known to the art and thus details thereof will not be repeated herein. The spirit of the present invention is that, the detection device 10 may dynamically adjust a smoothing parameter according to a trace variation of the detection device 10 so as to determine a smoothness of the motion of the cursor 91.

Figure 2:
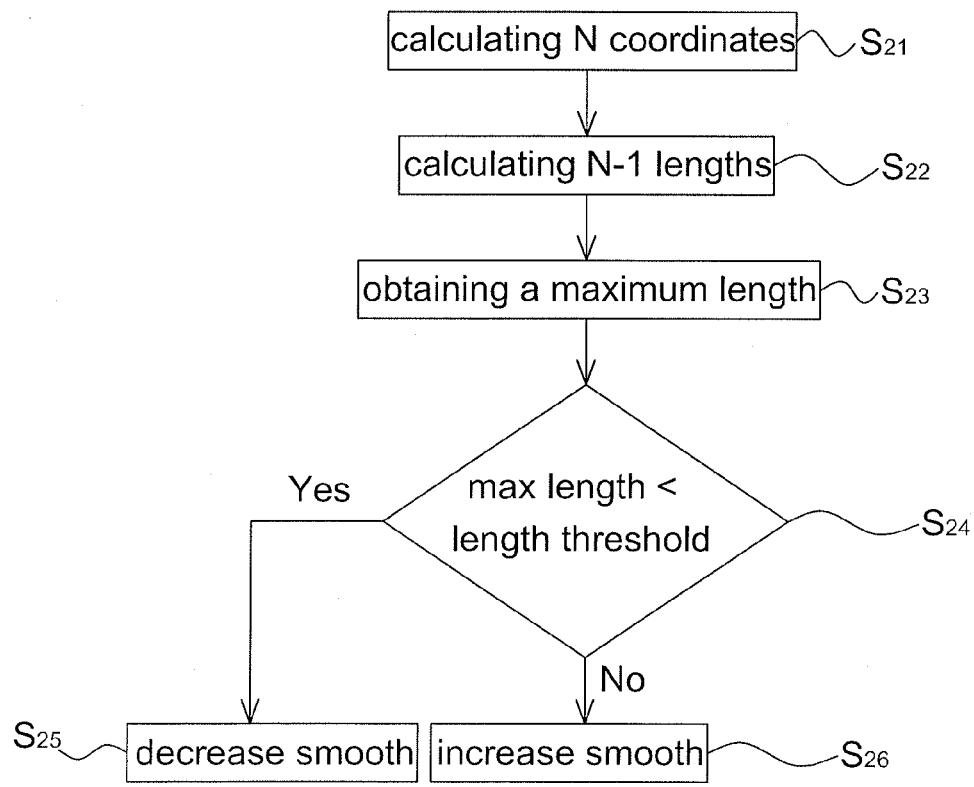
FIG. 2 shows a flow chart of the cursor control method according to the first embodiment of the present invention.

Please refer to FIG. 2, it shows a flow chart of the cursor control method according to the first embodiment of the present invention, and this embodiment is mainly used to identify whether the detection device 10 is performing a small range movement. When the detection device 10 is performing a small range movement (e.g. substantially a circle motion), a cursor motion range outputted by the detection device 10 may be smaller than an actual trace range detected by the detection device 10 if the smoothing parameter is set too high, and thus a smoothness of the cursor motion has to be decreased so that the cursor motion outputted by the detection device 10 can be closer to the actual trace.

The cursor control method of this embodiment includes the steps of: calculating N coordinates (Step $S_{21}$); calculating N−1 trace lengths (Step $S_{22}$); obtaining a maximum length (Step $S_{23}$); identifying whether the maximum length is smaller than a length threshold (Step $S_{24}$); if yes, decreasing a smoothness (Step $S_{25}$); if not, increasing the smoothness (Step $S_{26}$).

Figure 3:
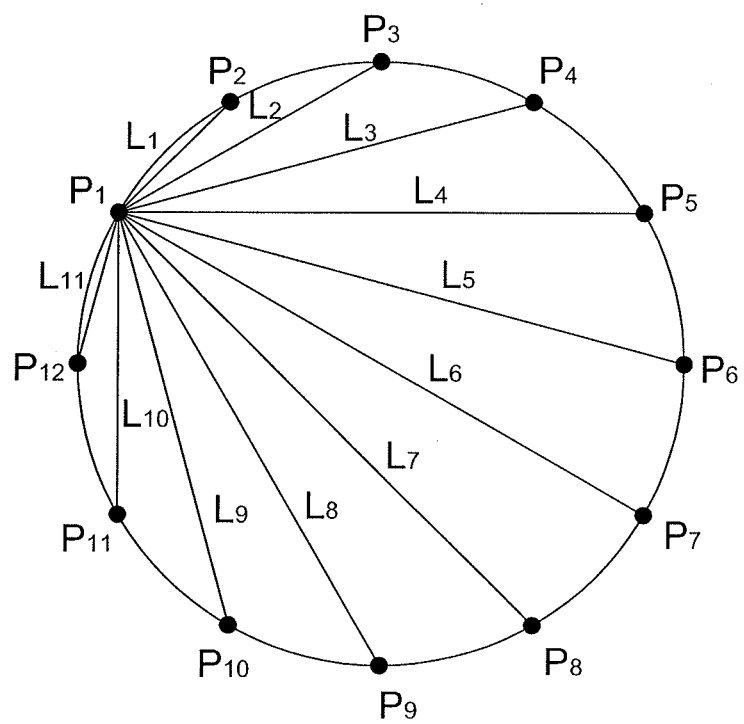
FIG. 3 shows an operational schematic diagram of the cursor control method shown in FIG. 2.

Please refer to FIGS. 1 to 3, FIG. 3 shows an operational schematic diagram of the cursor control method shown in FIG. 2. The detection device 10 continuously detects and stores N detection point coordinates $P_i(x_i,y_i)$ during operation (Step $S_{21}$), wherein i may be 1 to 12, and $P_1$ represents a coordinate of the earliest acquired detection point of the N detection points and $P_{12}$ represents a coordinate of the latest acquired detection point of the N detection points herein. It is appreciated that a value of N may be determined according to actual requirements; for example, N may be determined according to a frame rate of the detection device 10 or preset as a fixed predetermined value, but not limited thereto. When the detection device 10 detects a new detection point coordinate (e.g. $P_{13}$), the coordinate of the earliest acquired detection point of the N detection points (e.g. $P_1$) may be removed, and new detection point coordinates $P_i(x_i,y_i)$ may be continuously detected by using this first-in first-out process.

Next, the detection device 10 calculates N−1 trace lengths $L_j$ according to the N detection point coordinates $P_i(x_i,y_i)$, wherein a method for calculating the trace lengths may be performed by using conventional distance formula as shown in equation (1), where j may be 1 to 11 herein, but not limited thereto (Step $S_{22}$), $$L_j=\sqrt{(x_{j+1}-x_j)^2+(y_{j+1}-y_j)^2} \quad (1)$$

It should be mentioned that, in other embodiments, the detection device 10 may directly calculate the N−1 trace lengths according to different detection methods without performing the step $S_{21}$; for example, when the detection device 10 is a mouse or a pointing device, it may directly calculate the N−1 trace lengths without calculating the coordinate of every detection point previously.

Next, after the detection device 10 obtains a maximum length of the N−1 trace lengths (Step $S_{23}$), the detection device 10 compares the maximum length with a length threshold, wherein the length threshold is served as a threshold value for defining a small range movement and the value thereof may be set according to actual requirements (Step $S_{24}$). The detection device 10 then adjusts a smoothness of the cursor motion according a comparison result thereof. For example, when the detection device 10 identifies that the maximum length is smaller than the length threshold, it means that the detection device 10 is performing a small range movement and the smoothness of the cursor motion is decreased so that the outputted cursor motion can be closer to an actual trace (Step $S_{25}$). On the contrary, when the detection device 10 identifies that the maximum length is larger than the length threshold, the smoothness is increased so that the cursor motion outputted by the detection device 10 can be smoother. In addition, it is appreciated that the trace and detection points shown in FIG. 3 are only examples rather than limitations to the present invention.

Figure 4:
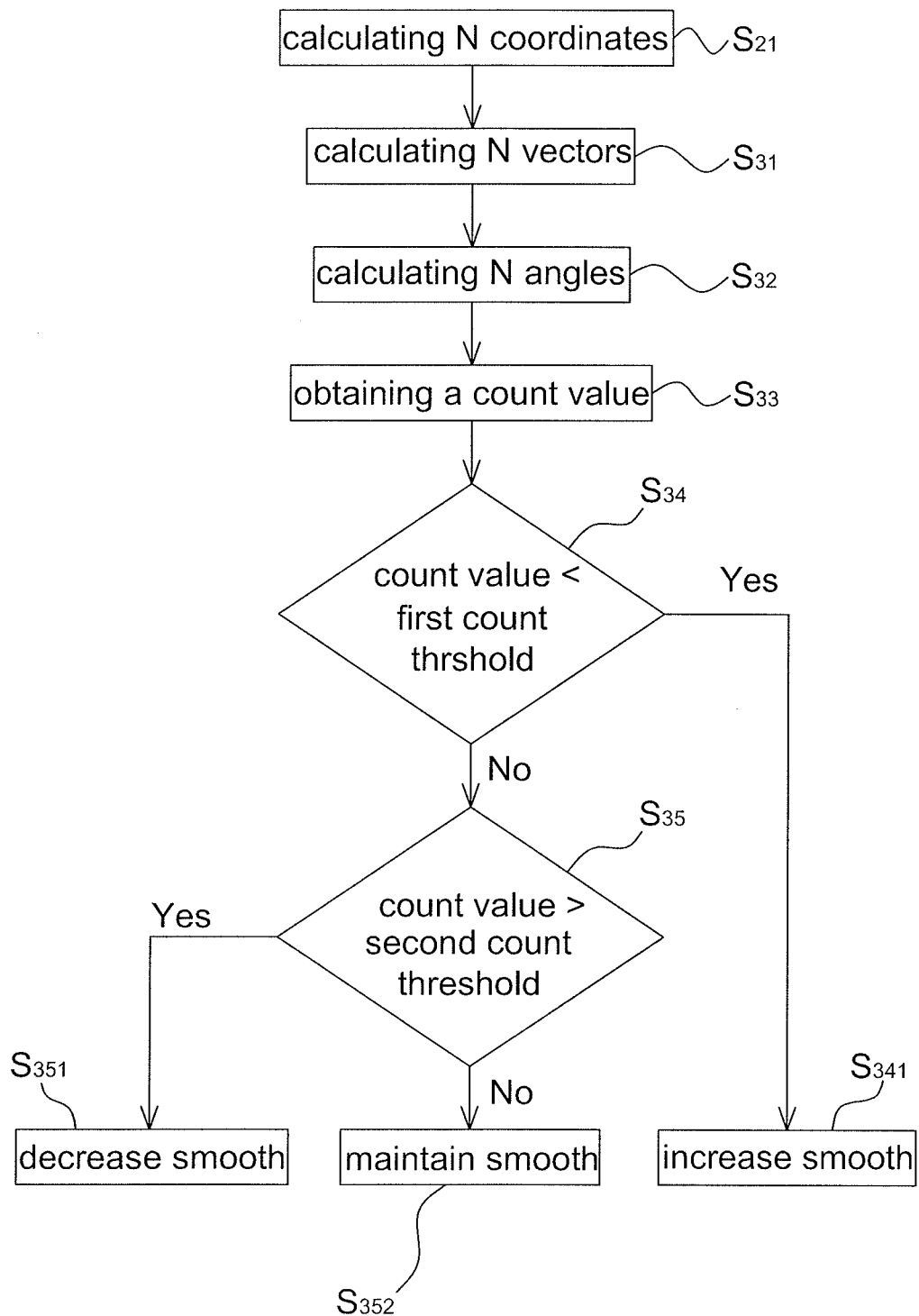
FIG. 4 shows a flow chart of the cursor control method according to the second embodiment of the present invention.

Please refer to FIG. 4, it shows a flow chart of the cursor control method according to the second embodiment of the present invention, and this embodiment is mainly used to identify the sharpness of a moving trace of the detection device 10. When the sharpness of the moving trace of the detection device 10 becomes higher, the smoothness of the outputted cursor motion needs to be decreased so that the cursor motion can be closer to an actual moving trace; on the contrary, when the sharpness of the moving trace of the detection device 10 becomes lower, the smoothness of the outputted cursor motion needs to be increased so that the cursor motion can become smoother; and when the sharpness of the moving trace of the detection device 10 substantially maintains unchanged, the smoothness of the cursor motion will be kept unchanged.

The cursor control method of this embodiment includes the steps of: calculating N coordinates (Step $S_{21}$); calculating N motion vectors (Step $S_{31}$); calculating N included angles (Step $S_{32}$); obtaining a count value (Step $S_{33}$); identifying whether the count value is smaller than a first count threshold (Step $S_{34}$); if yes, increasing a smoothness (Step $S_{341}$); if not, identifying whether the count value is larger than a second count threshold (Step $S_{35}$); if yes, decreasing the smoothness (Step $S_{351}$); if the count value is still smaller than the second count threshold, the smoothness is kept unchanged (Step $S_{352}$). Is should be mentioned that, a sequence of the steps $S_{34}$ and $S_{35}$ may be exchanged and does not limited to that shown in FIG. 4. In one embodiment, the steps $S_{34}$ to $S_{35}$ may be combined together. That is, it is able to compare the count value with the first count threshold and second count threshold simultaneously, and the smoothness is increased when the count value is smaller than the first count threshold; the smoothness is maintained when the count value is between the first count threshold and the second count threshold; and the smoothness is decreased when the count value is larger than the second count threshold; wherein the first count threshold is smaller then the second count threshold.

Figure 5A:
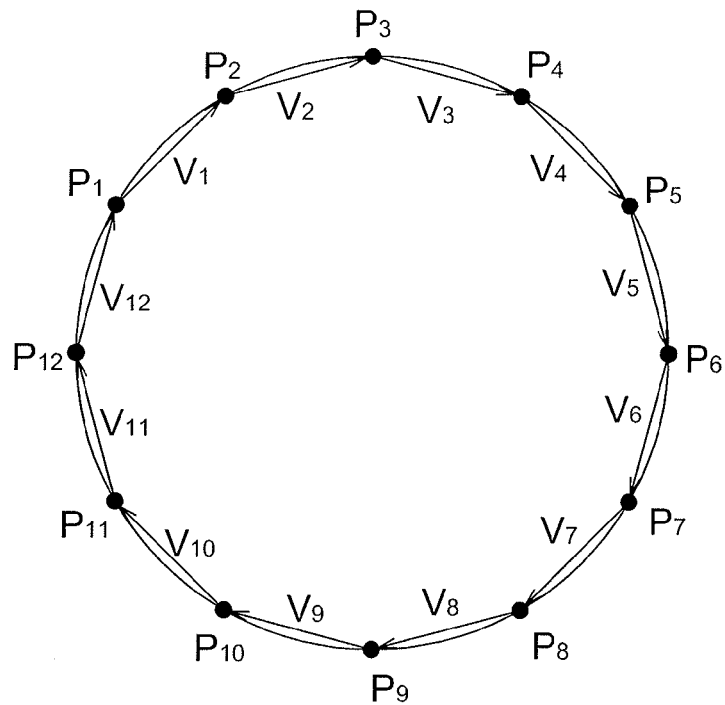
FIG. 5A shows an operational schematic diagram of the cursor control method shown in FIG. 4.

Please refer to FIGS. 1, 4 and 5A together, FIG. 5A shows an operational schematic diagram of the cursor control method shown in FIG. 4. The detection device 10 also continuously detects and stores N detection point coordinates $P_i(x_i, y_i)$ during operation (Step $S_{21}$), wherein this step has been described in the first embodiment and thus details thereof will not be repeated herein.

Next, the detection device 10 calculates N motion vectors $V_i$ (i may be 1 to 12 herein) by using the N detection point coordinates $P_i(x_i, y_i)$, wherein a method for calculating the motion vectors may use conventional vector equation, for example $V_i = (x_{i+1} - x_i, y_{i+1} - y_i)$, but not limited thereto (Step $S_{31}$). It should be mentioned that, in other embodiments, the detection device 10 may directly calculate the N motion vectors according to different detection methods without performing the step $S_{21}$; for example, when the detection device 10 is a mouse or a pointing device, it may directly calculate the N motion vectors without calculating the coordinate of every detection point previously.

Next, the detection device 10 calculates an angle variation between every two successive motion vectors of the N motion vectors $V_i$; for example, an included angle between two successive motion vectors may be calculated according to equation (2) (Step $S_{32}$), $$\cos\theta_i = \frac{V_i \cdot V_{i+1}}{\|V_i\| \times \|V_{i+1}\|} \quad (2)$$

Figure 5B:
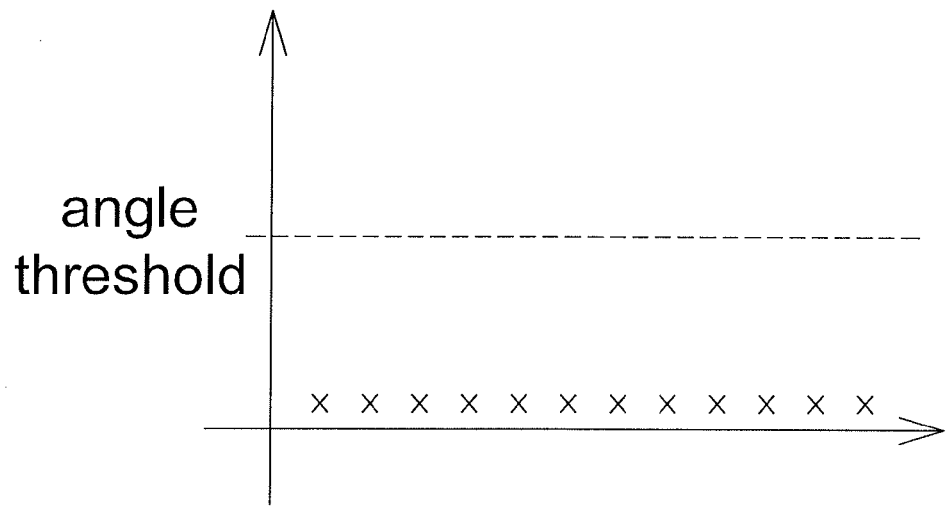
FIG. 5B shows a schematic diagram of obtaining a count value in the cursor control method shown in FIG. 5A.

Next, the detection device 10 compares the calculated N included angles $\theta_i$ with an angle threshold as shown in FIG. 5B, wherein the angle threshold may be determined according to actual requirements. When the included angle $\theta_i$ is larger than the angle threshold, the count value is added by 1; and when the included angle $\theta_i$ is smaller than the angle threshold, the count value is kept unchanged. In this manner, the value of the count value may be used to represent the sharpness of the moving trace between the detection points $P_1$ to $P_N$, and a larger count value refers a sharper moving trace and a smaller count value refers a smoother moving trace. For example, in FIG. 5B all included angles are smaller than the angle threshold, and thus the count value is 0 (Step $S_{53}$).

Figure 6A:
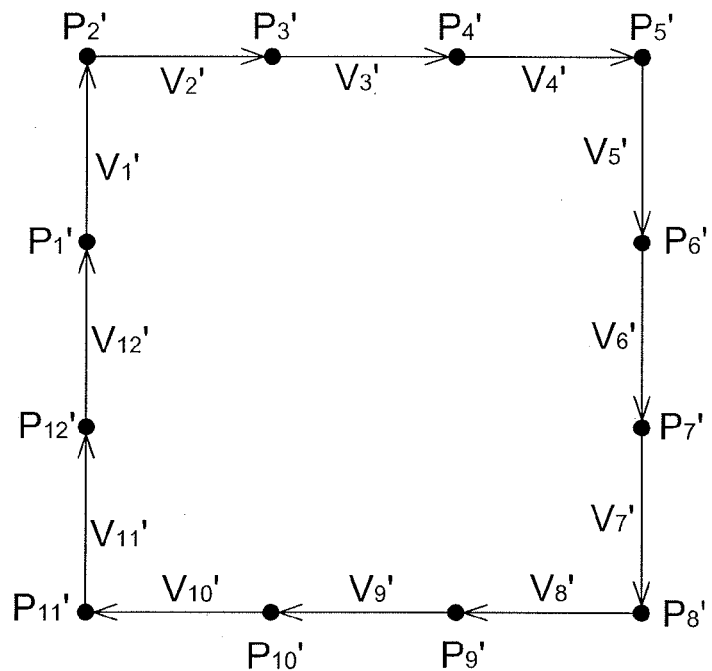
FIG. 6A shows another operational schematic diagram of the cursor control method shown in FIG. 4.
Figure 6B:
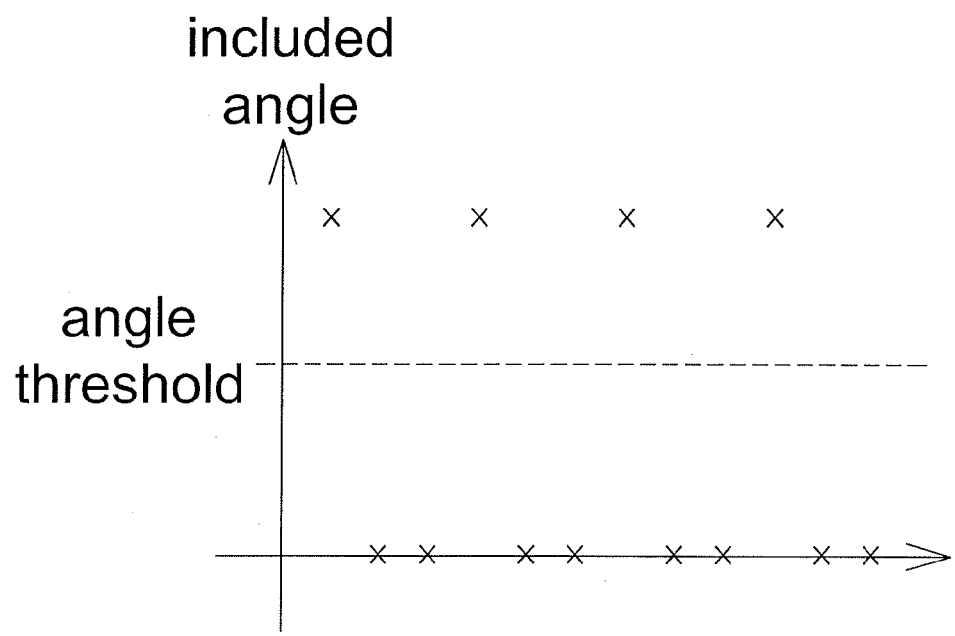
FIG. 6B shows a schematic diagram of obtaining a count value in the cursor control method shown in FIG. 6A.

Please refer to FIG. 6A, it shows a schematic diagram of another moving trace of the detection device 10. In this embodiment, the detection device 10 also sequentially obtains the detection point coordinate $P_i'$ and/or the motion vector $V_i'$ and the included angle $\theta_i'$ (Steps $S_{21}$ to $S_{33}$). Next, the detection device 10 compares the calculated N included angles $\theta_i'$ with an angle threshold as shown in FIG. 6B, wherein the angle threshold is set as 90 degrees herein. Therefore, in FIG. 6B the count value obtained by the detection device 10 is 4 (Step $S_{33}$). In this manner, the detection device 10 may identify the sharpness of the moving trace thereof according the count value.

Please refer to FIG. 4 again, the detection device 10 then compares the count value with a first count threshold and a second count threshold (Steps $S_{34}$ to $S_{35}$), and the first count threshold is smaller than the second count threshold in this embodiment, and the first count threshold and the second count threshold may be factors of N and they may be determined according to an actual requirement of the smoothness of the cursor motion.

When the count value is smaller than the first count threshold, it means that the sharpness of the moving trace of the detection device 10 is decreased and thus the smoothness of the cursor motion is increased so that the cursor motion outputted from the detection device 10 can become smoother (Step $S_{341}$), and the step $S_{21}$ or $S_{31}$ is re-executed to perform a next adjustment process. When the count value is between the first count threshold and the second count threshold, it means that the sharpness of the moving trace is substantially unchanged and thus the smoothness is kept unchanged (Step $S_{352}$). When the count value is larger than the second count threshold, it means that the sharpness of the moving trace is decreased and thus the smoothness of the cursor motion is decreased so that the cursor motion outputted from the detection device 10 can be closer to an actual moving trace of the detection device 10 (Step $S_{351}$).

Figure 7:
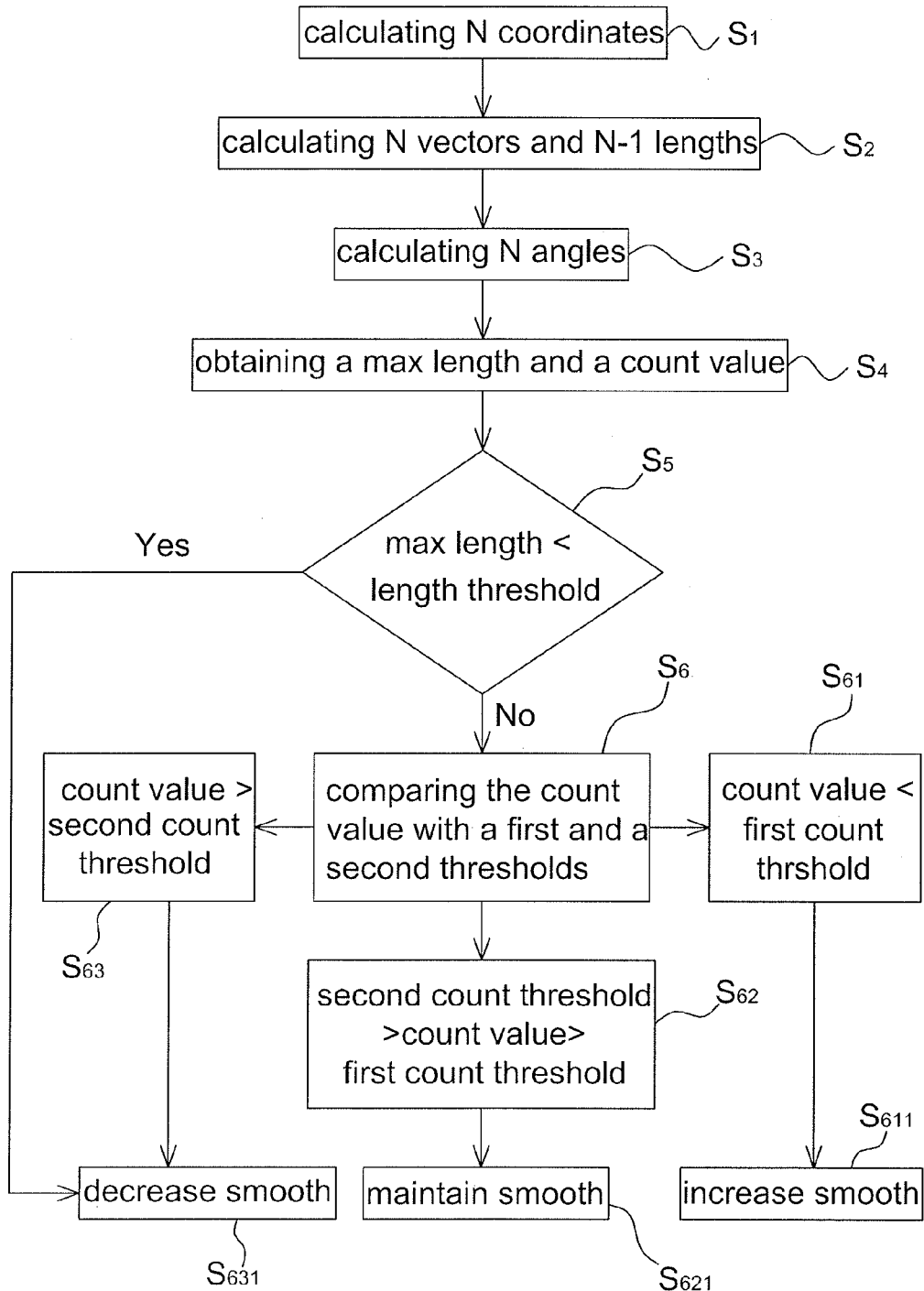
FIG. 7 shows a flow chart of the cursor control method according to the third embodiment of the present invention.

Please refer to FIG. 7, it shows a flow chart of the cursor control method according to the third embodiment of the present invention, which includes the steps of: calculating N coordinates (Step $S_1$); calculating N motion vectors and N−1 trace lengths (Step $S_2$); calculating N included angles (Step $S_3$); obtaining a maximum length and a count value (Step $S_4$); identifying whether the maximum length is smaller than a length threshold (Step $S_s$); if yes, decreasing a smoothness; if not, comparing the count value with a first count threshold and a second count threshold (Step $S_6$); increasing the smoothness when the count value is smaller than the first count threshold (Step $S_{61}$, $S_{611}$); maintaining the smoothness when the count value is between the first count threshold and the second count threshold (Step $S_{62}$, $S_{621}$); and decreasing the smoothness when the count value is larger than the second count threshold (Step $S_{63}$, $S_{631}$). As this embodiment is a combination of the above first and second embodiments, details thereof have been described above and will not be repeated herein.

In another embodiment, when the maximum length in FIG. 7 is larger than a length threshold, the steps $S_{34}$ to $S_{35}$ shown in FIG. 4 may be sequentially performed, i.e. comparing the count value with a first count threshold (Step $S_{34}$); increasing the smoothness when the count value is smaller than the first count value (Step $S_{341}$) and detecting another new detection point with the detection device 10 to re-execute the cursor control method of the third embodiment of the present invention. Otherwise, when the count value is larger than the first count threshold, the detection device 10 then compares the count value with a second count threshold (Step $S_{35}$) and maintains the smoothness when the count value is smaller than the second count threshold (Step $S_{352}$) or decreases the smoothness when the count value is larger than the second count threshold (Step $S_{351}$).

It should be mentioned that in all embodiments of the present invention a value of N may be set according to actual operational conditions and may not be a fixed value.

As mentioned above, the conventional navigation device needs to select a proper smoothing parameter to make the cursor motion outputted therefrom be closer to an actual moving trace of the navigation device. The present invention further provides a cursor control method that can real-timely adjust the smoothing parameter according to a trace variation detected by a detection device.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A cursor control method for adjusting a smoothness of a cursor motion on an image display according to a trace variation detected by a detection device, the cursor control method comprising:
   calculating a plurality of trace lengths with the detection device;
   obtaining a maximum length of the plurality of trace lengths;
   decreasing the smoothness when the maximum length is smaller than a length threshold; and
   increasing the smoothness when the maximum length is larger than the length threshold.

2. The cursor control method as claimed in claim 1, wherein in the calculating, the detection device acquires a predetermined number of detection points and calculates distances between the detection point acquired earliest and the other detection points served as the plurality of trace lengths.

3. The cursor control method as claimed in claim 1, wherein in the calculating, the detection device detects a predetermined number of coordinates and calculates the plurality of trace lengths according to the coordinates.

4. The cursor control method as claimed in claim 1, wherein the detection device is a mouse, a pointing device or a touch control device.

5. A cursor control method for adjusting a smoothness of a cursor motion on an image display according to a trace variation detected by a detection device, the cursor control method comprising the steps of:
   calculating a plurality of motion vectors with the detection device;
   calculating included angles between every two successive motion vectors;
   comparing the included angles with an angle threshold to obtain a count value; and
   adjusting the smoothness according to the count value.

6. The cursor control method as claimed in claim 5, wherein the count value is a number of the included angles larger than the angle threshold.

7. The cursor control method as claimed in claim 5, wherein the step of adjusting the smoothness according to the count value further comprises the steps of:
   increasing the smoothness when the count value is smaller than a first count threshold;
   maintaining the smoothness when the count value is between the first count threshold and a second count threshold; and
   decreasing the smoothness when the count value is larger than the second count threshold;
   wherein the first count threshold is smaller than the second count threshold.

8. The cursor control method as claimed in claim 5, wherein the step of adjusting the smoothness according to the count value further comprises the steps of:
   comparing the count value with a first count threshold;
   increasing the smoothness and re-executing the step of calculating a plurality of motion vectors with the detection device when the count value is smaller than the first count threshold;
   comparing the count value with a second count threshold when the count value is larger than the first count threshold;
   maintaining the smoothness when the count value is smaller than the second count threshold; and
   decreasing the smoothness when the count value is larger than the second count threshold;
   wherein the first count threshold is smaller than the second count threshold.

9. The cursor control method as claimed in claim 5, wherein in the step of calculating a plurality of motion vectors with the detection device, the detection device detects a predetermined number of coordinates and calculates the plurality of motion vectors according to the coordinates.

10. The cursor control method as claimed in claim 5, wherein the detection device is a mouse, a pointing device or a touch control device.

11. A cursor control method for adjusting a smoothness of a cursor motion on an image display according to a trace variation detected by a detection device, the cursor control method comprising the steps of:
    calculating a plurality of trace lengths and motion vectors with the detection device;
    calculating included angles between every two successive motion vectors;
    obtaining a maximum length of the plurality of trace lengths and obtaining a count value according to the included angles;
    comparing the maximum length with a length threshold;
    decreasing the smoothness when the maximum length is smaller than the length threshold; and
    adjusting the smoothness according to the count value when the maximum length is larger than the length threshold.

12. The cursor control method as claimed in claim 11, wherein in the step of calculating a plurality of trace lengths and motion vectors with the detection device, the detection device detects a predetermined number of coordinates and calculates the plurality of trace lengths and the plurality of motion vectors according to the coordinates.

13. The cursor control method as claimed in claim 11, wherein the count value is a number of the included angles larger than an angle threshold.

14. The cursor control method as claimed in claim 11, wherein the step of adjusting the smoothness according to the count value further comprises:
    increasing the smoothness when the count value is smaller than a first count threshold;
    maintaining the smoothness when the count value is between the first count threshold and a second count threshold; and
    decreasing the smoothness when the count value is larger than the second count threshold;
    wherein the first count threshold is smaller than the second count threshold.

15. The cursor control method as claimed in claim 11, wherein the step of adjusting the smoothness according to the count value further comprises:
    comparing the count value with a first count threshold;
    increasing the smoothness and re-executing the step of calculating a plurality of trace lengths and motion vectors with the detection device when the count value is smaller than the first count threshold;
    comparing the count value with a second count threshold when the count value is larger than the first count threshold;
    maintaining the smoothness when the count value is smaller than the second count threshold; and
    decreasing the smoothness when the count value is larger than the second count threshold;
    wherein the first count threshold is smaller than the second count threshold.

16. The cursor control method as claimed in claim 11, wherein the detection device is a mouse, a pointing device or a touch control device.

\* \* \* \* \*